(12) United States Patent
Chang et al.

(10) Patent No.: US 11,121,805 B2
(45) Date of Patent: Sep. 14, 2021

(54) SYSTEMS AND METHODS FOR DETERMINING INITIAL CHANNEL QUALITY CONDITIONS OF A CHANNEL FOR PROVISION OF CONTENT

(71) Applicant: Verizon Patent and Licensing Inc., Arlington, VA (US)

(72) Inventors: Patricia R. Chang, San Ramon, CA (US); Daryl M. Low, San Jose, CA (US); Jin Yang, Orinda, CA (US); Arda Aksu, Lafayette, CA (US); Donna L. Polehn, Mercer Island, WA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 142 days.

(21) Appl. No.: 16/670,468

(22) Filed: Oct. 31, 2019

(65) Prior Publication Data
US 2021/0135780 A1   May 6, 2021

(51) Int. Cl.
| | | |
|---|---|---|
| *H04L 1/00* | (2006.01) |
| *H04L 12/26* | (2006.01) |
| *H04L 12/825* | (2013.01) |
| *H04L 12/851* | (2013.01) |

(52) U.S. Cl.
CPC ........ *H04L 1/0026* (2013.01); *H04L 43/0817* (2013.01); *H04L 47/2483* (2013.01); *H04L 47/25* (2013.01)

(58) Field of Classification Search
None
See application file for complete search history.

(56) References Cited

U.S. PATENT DOCUMENTS

2021/0037399 A1* 2/2021 Jat ......................... H04W 24/04

* cited by examiner

*Primary Examiner* — Christine T Duong

(57) ABSTRACT

A device may receive channel data associated with a channel provided between a network and a user device, and may calculate, based on the channel data, key performance indicator data that includes a plurality of key performance indicators for the channel. The device may multiply the plurality of key performance indicators by factors to generate factored key performance indicator data that includes a plurality of factored key performance indicators. The device may apply weights to the plurality of factored key performance indicators of the factored key performance indicator data to generate factored weighted key performance indicator data that includes a plurality of factored weighted key performance indicators. The device may calculate a quality indicator for the channel based on the factored weighted key performance indicator data, and may perform one or more actions based on the quality indicator for the channel.

20 Claims, 10 Drawing Sheets

100 ⟶

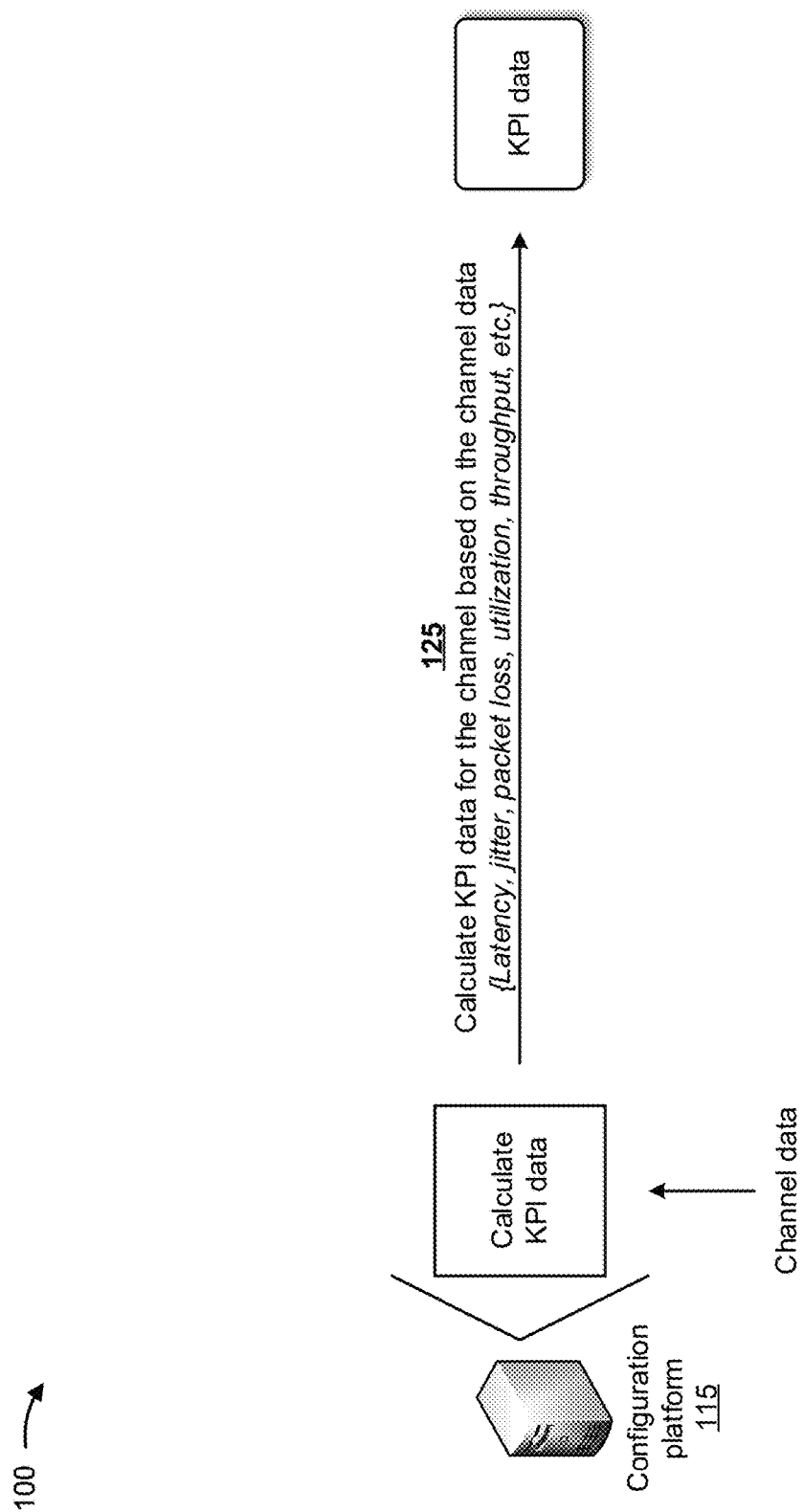

SYSTEMS AND METHODS FOR DETERMINING INITIAL CHANNEL QUALITY CONDITIONS OF A CHANNEL FOR PROVISION OF CONTENT

BACKGROUND

A service provider may determine channel quality conditions associated with a channel provided between a user device (e.g., a customer) and a network utilized by the service provider. The service provider may utilize the channel quality conditions to provide a quality user experience for the user device without creating excessive congestion in the network.

BRIEF DESCRIPTION OF THE DRAWINGS

FIGS. 1A-1G are diagrams of one or more example implementations described herein.

DETAILED DESCRIPTION OF PREFERRED EMBODIMENTS

Figure 1A:
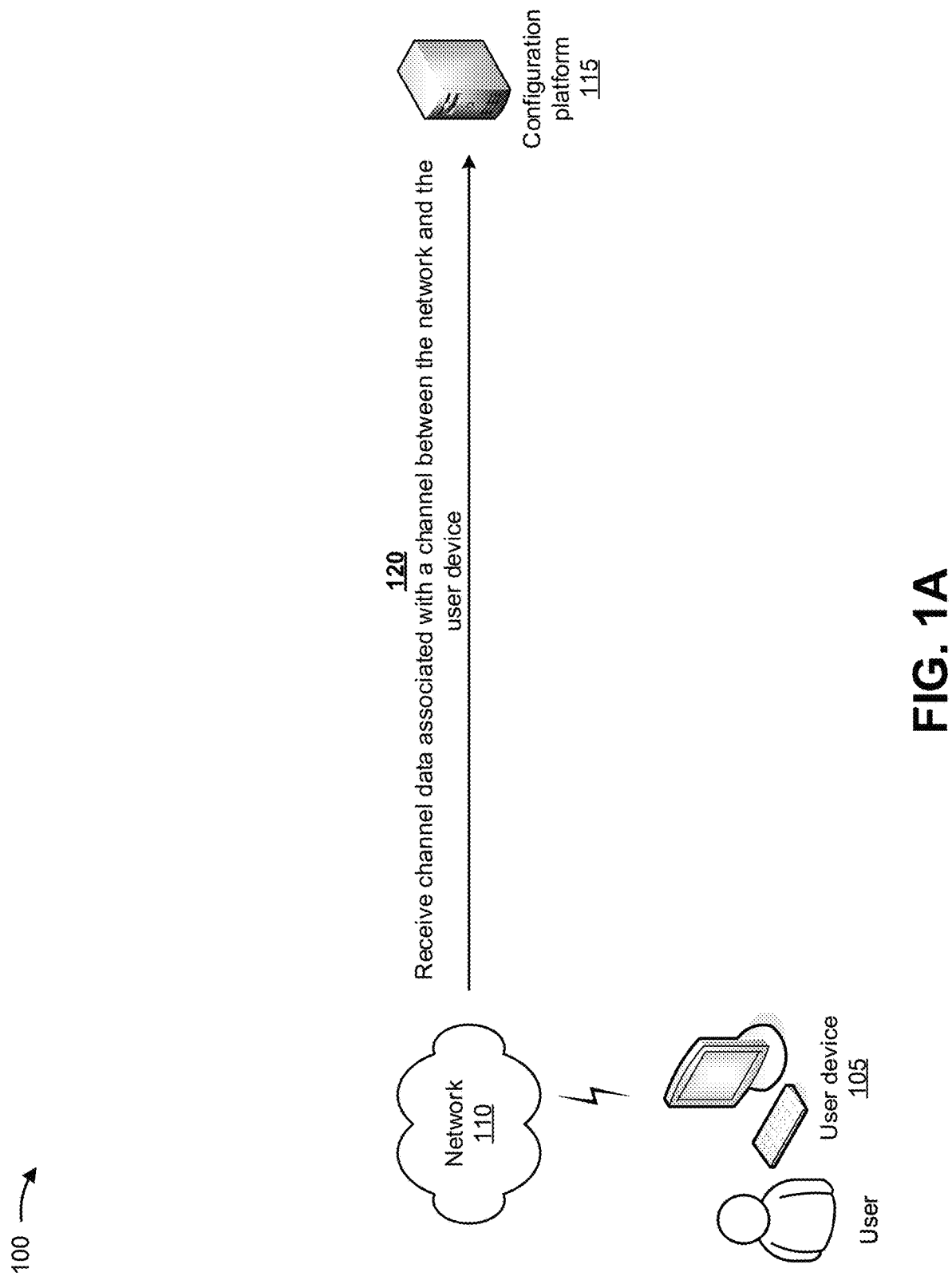

The following detailed description of example implementations refers to the accompanying drawings. The same reference numbers in different drawings may identify the same or similar elements.

Before providing content to a user device, a service provider determines an estimate of initial channel quality conditions associated with a channel provided between the user device and a network utilized by the service provider. However, the service provider typically determines an unreliable estimate of the initial channel quality conditions. Thus, when the service provider begins streaming the content to the user device, the service provider may utilize a very conservative data rate for transmitting the content in order to ensure that excessive congestion is not created in the network (e.g., which may cause an even slower data rate). This results in poor initial transmission of the content to the user device, a poor user experience, and wasted computing resources (e.g., processing resources, memory resources, communication resources, and/or the like), networking resources, and/or the like associated with failing to provide the content to the user device, retransmitting the content to the user device, and/or the like.

Some implementations described herein provide a configuration platform that determines initial channel quality conditions of a channel for provision of content. For example, the configuration platform may receive channel data associated with a channel provided between a network and a user device, and may calculate, based on the channel data, key performance indicator data that includes a plurality of key performance indicators for the channel. The plurality of key performance indicators may include data identifying a mobility of the user device, and one or more of a latency of the channel, jitter of the channel, a packet loss of the channel, utilization of the channel, throughput of the channel, a quality of service class identifier of the channel, a reference signal received power of the channel, or a geographic location of the user device. The configuration platform may multiply the plurality of key performance indicators by factors to generate factored key performance indicator data that includes a plurality of factored key performance indicators, and may apply weights to the plurality of factored key performance indicators of the factored key performance indicator data to generate factored weighted key performance indicator data that includes a plurality of factored weighted key performance indicators. The configuration platform may calculate a quality indicator for the channel based on the factored weighted key performance indicator data, and may perform one or more actions based on the quality indicator for the channel.

In this way, the configuration platform determines initial channel quality conditions of a channel for provisioning of content, and may provide the initial channel quality conditions to a network associated with a service provider. The initial channel quality conditions may be utilized to determine an initial data rate for providing the content, and to provide a good user experience. Thus, the configuration platform conserves computing resources, networking resources, and/or the like that would otherwise be wasted in failing to provide the content to the user device, retransmitting the content to the user device, and/or the like.

FIGS. 1A-1G are diagrams of one or more example implementations 100 described herein. As shown in FIG. 1A, a user device 105 may be associated with a user, a network 110, and a configuration platform 115. User device 105 may include a mobile device, a computer, a telephone, a set-top box, and/or the like that the user may utilize to interact with and/or obtain information from network 110. Network 110 may include a wired and/or wireless network that may provide, for example, content to user device 105. Configuration platform 115 may include a platform that determines initial channel quality conditions of a channel for provision of content from network 110 to user device 105.

As further shown in FIG. 1A, and by reference number 120, configuration platform 115 may receive channel data associated with communications on a channel between network 110 and user device 105. For example, configuration platform 115 may receive the channel data from network 110 (e.g., from a network device of network 110); from one or more operations, administration and management (OAM) systems associated with network 110; from a data structure (e.g., a database, a table, a list, and/or the like) associated with network 110; from a data structure associated with the one or more OAM systems; and/or the like. In some implementations, configuration platform 115 may periodically receive the channel data, may continuously receive the channel data, may receive the channel data based on a request, and/or the like. In some implementations, configuration platform 115 may store the channel data in a data structure associated with configuration platform 115, in the data structure associated with network 110, in the data structure associated with the one or more OAM systems, and/or the like.

As shown in FIG. 1B, and by reference number 125, configuration platform 115 may calculate key performance indicator (KPI) data for the channel based on the channel data. In some implementations, the KPI data may include data identifying one or more KPIs for the channel. The KPIs may measure network performance associated with the channel to determine whether network 110 (e.g., a portion of network 110 that provides the channel) is performing successfully with respect to one or more particular types of data or content, with respect to one or more particular types of users or user devices 105, with respect to one or more particular objectives, and/or the like. For example, the KPIs may include data identifying a mobility of user device 105 (e.g., as determined based on signal strength of communications received from user device 105), a latency of the channel, jitter of the channel, a packet loss of the channel, utilization of the channel, throughput of the channel, a quality of service (QoS) class identifier of the channel, a reference signal received power of the channel, a geographic location of user device 105, and/or the like.

Figure 1C:
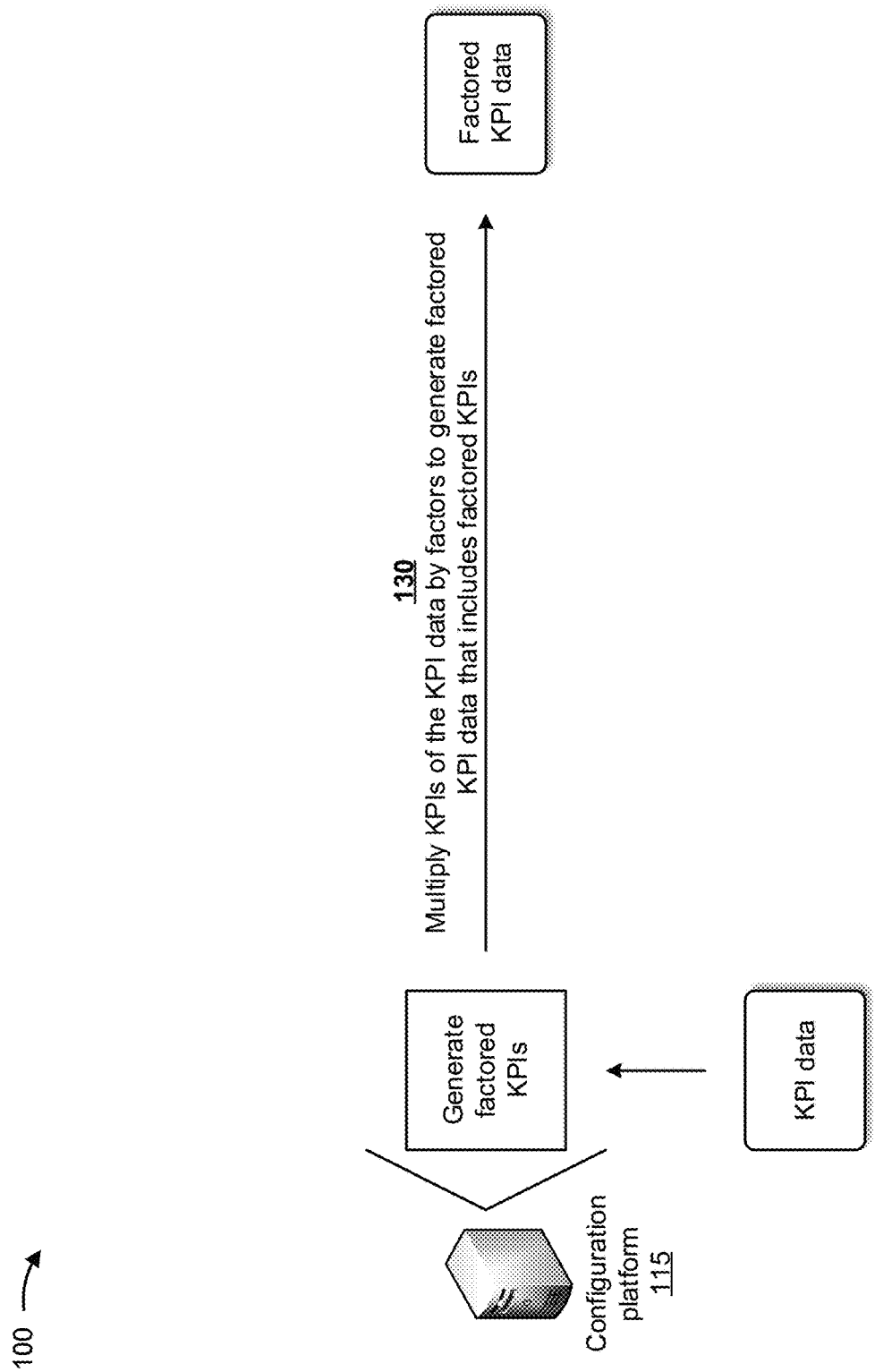

As shown in FIG. 1C, and by reference number 130, configuration platform 115 may multiply the KPIs of the KPI data by factors to generate factored KPI data that includes factored KPIs. In some implementations, configuration platform 115 may multiply each of one or more of the KPIs by a factor that enables the factored KPIs to be measured, compared, analyzed, processed, weighted, and/or the like based on a context (e.g., a unit of measurement, a range, a scale, a dimension, and/or the like) that is common to all of the factored KPIs. For example, the factor for each KPI may depend on a unit of measure of the KPI that was used to measure the KPI, such that multiplying the KPI by the factor will generate a factored KPI with a unit of measure that is common to all of the factored KPIs. In some implementations, configuration platform 115 may multiply a value of each of the KPIs by a factor that homologates the value to a scalar value. The scalar values of the factored KPIs may be utilized by configuration platform 115 to compare different ones of the KPIs.

Figure 1D:
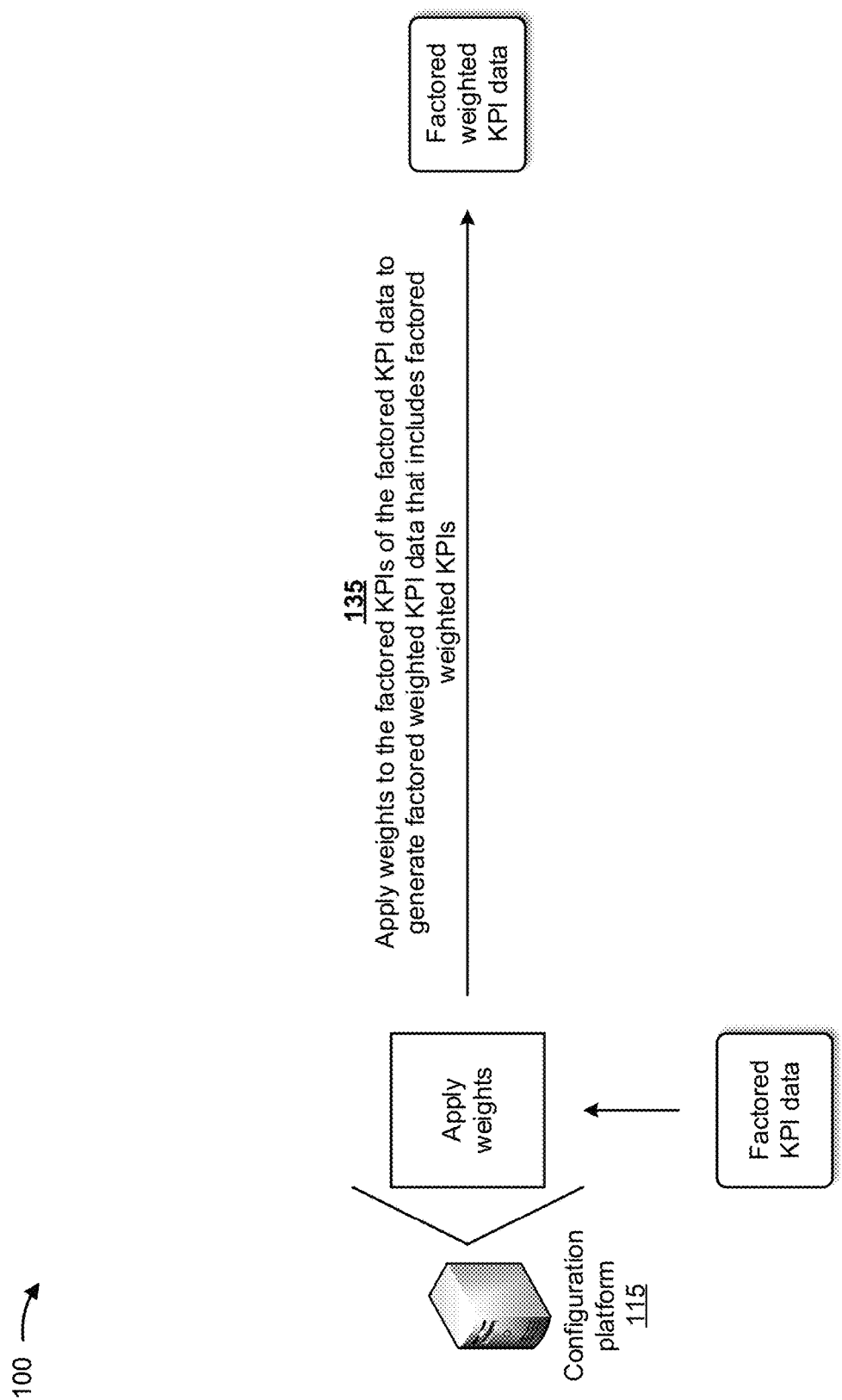

As shown in FIG. 1D, and by reference number 135, configuration platform 115 may apply weights to the factored KPIs of the factored KPI data to generate factored weighted KPI data that includes factored weighted KPIs. Configuration platform 115 may weight each factored KPI, of the factored KPIs, based on an importance of the KPI as an indicator of a performance quality of the channel of network 110. For example, configuration platform 115 may apply a greater weight to a factored KPI, associated with a throughput of the channel, than a weight applied to a factored KPI associated with jitter of the channel, when the throughput of the channel provides a better indicator of the performance quality of the channel than the jitter of the channel.

In some implementations, configuration platform 115 may apply different weights for different types of KPIs, for different networks 110, for different types of networks 110, for different channels, for different types of channels, and/or the like. In some implementations, configuration platform 115 may calculate variances associated with the factored weighted KPIs, and may modify one or more of the KPIs based on the variances associated with the factored weighted KPIs. The modifications of the KPIs may, in turn, cause modifications of corresponding factored weighted KPIs. In some implementations, the factored weighted KPIs may include data indicating a likelihood that a geographic location of user device 105 changes over time, data based on a moving average and indicating a likelihood that the geographic location of user device 105 changes over time, and/or the like.

Figure 1E:
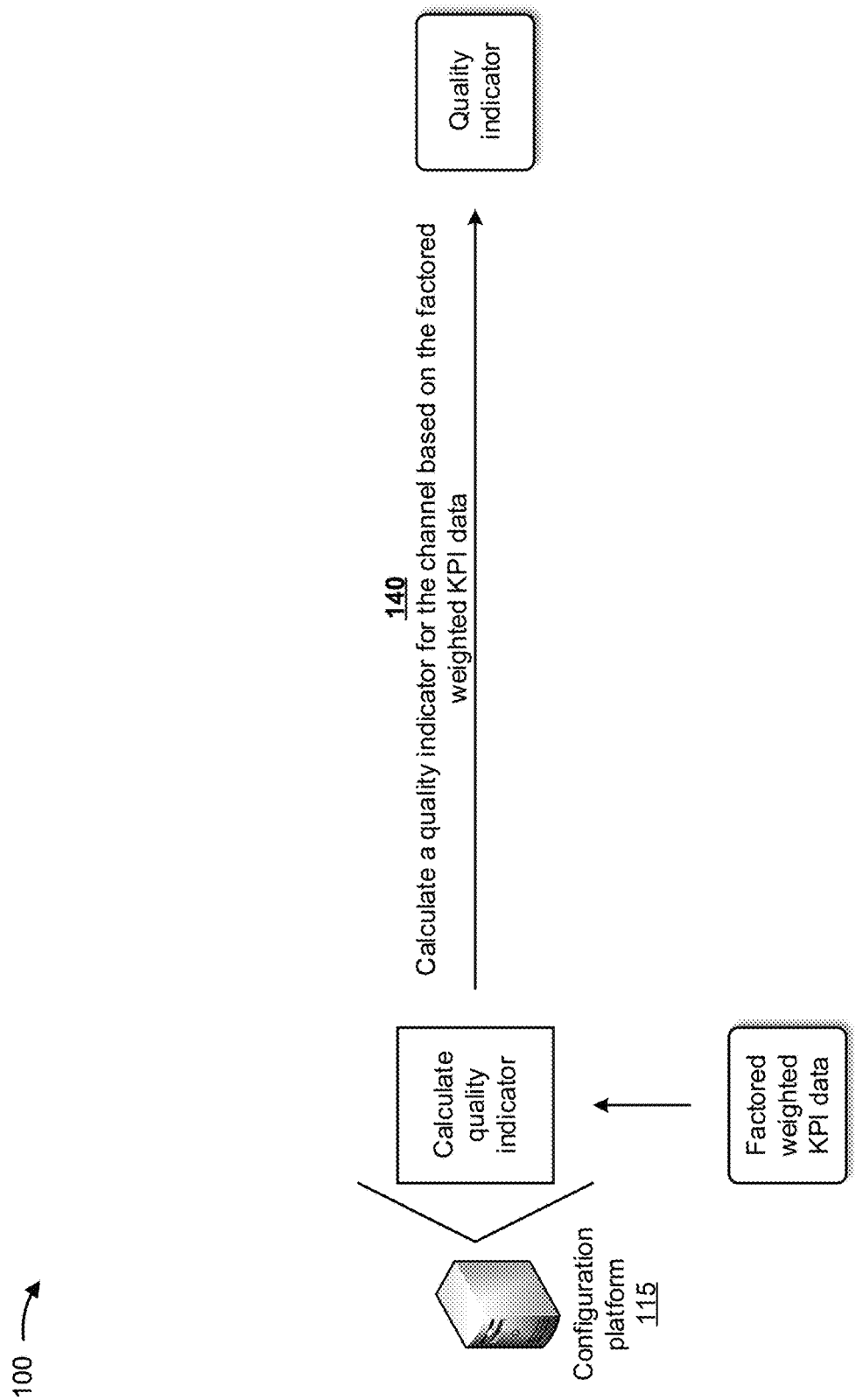

As shown in FIG. 1E, and by reference number 140, configuration platform 115 may calculate a quality indicator for the channel based on the factored weighted KPI data. In some implementations, configuration platform 115 may calculate the quality indicator by applying a function to the factored weighted KPI data. For example, configuration platform 115 may calculate the quality indicator by adding the factored weighted KPIs together. In some implementations, configuration platform 115 may calculate the quality indicator as a value (e.g., a score) that falls within a designated range (e.g., a scale of one to one-hundred, with one-hundred being a greatest quality indicator). In some implementations, configuration platform 115 may calculate the quality indicator as an average of the factored weighted KPIs, may calculate the quality indicator as a mean of the factored weighted KPIs, may calculate the quality indicator as a median of the factored weighted KPIs, and/or the like.

Figure 1F:
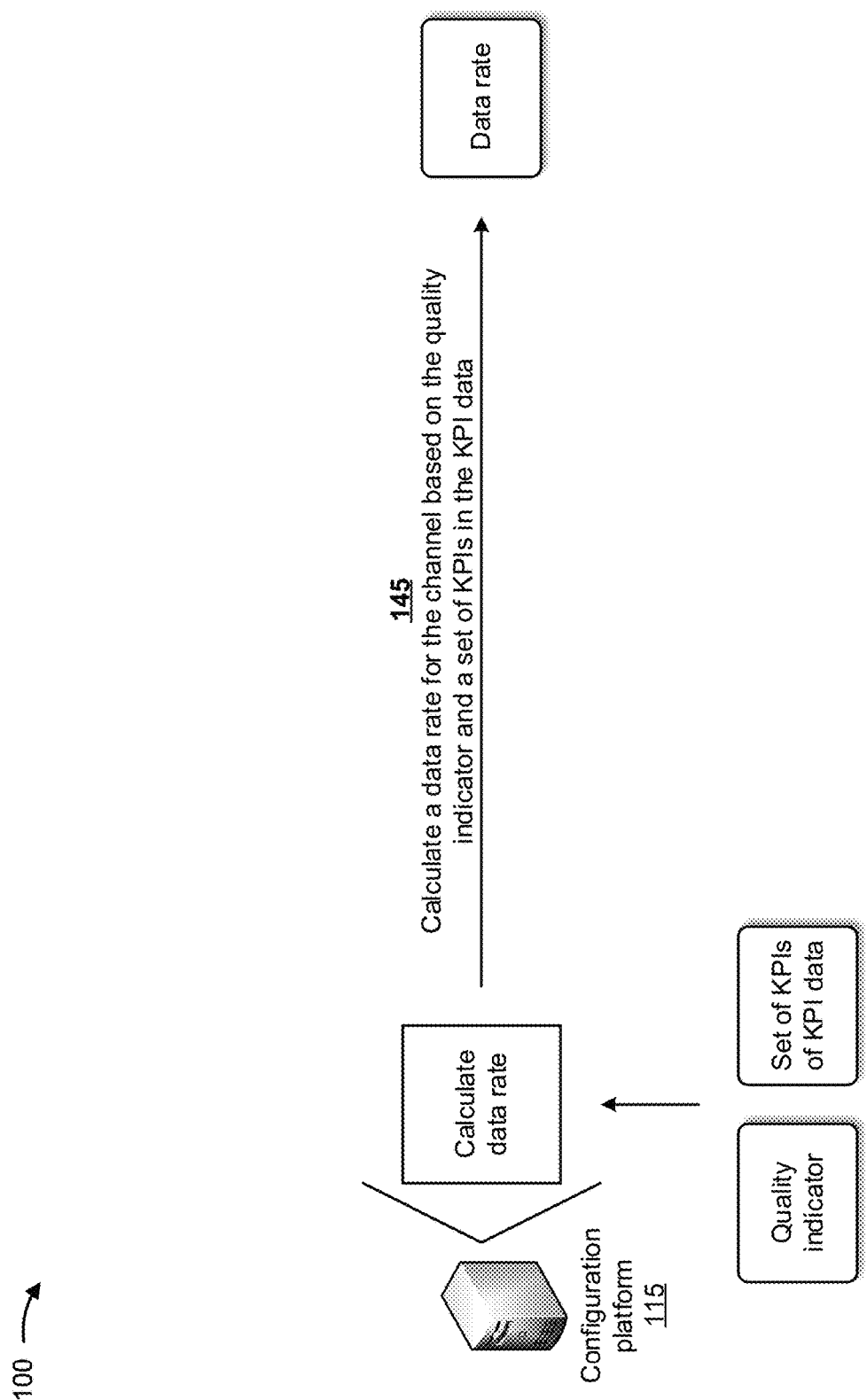

As shown in FIG. 1F, and by reference number 145, configuration platform 115 may calculate a data rate for the channel based on the quality indicator, and/or a set of KPIs in the KPI data. The set of KPIs may include none of the KPIs to all of the KPIs in the KPI data (e.g., none of the KPIs may be utilized to calculate the data rate or one or more of the KPIs may be utilized to calculate the data rate), none of the factored KPIs to all of the factored KPIs, none of the factored weighted KPIs to all of the factored weighted KPIs, and/or the like. The data rate for the channel may include a speed of data transmission by the channel (e.g., in bits per second), and may depend on a bandwidth available to the channel, a quantity of levels in a digital signal transmitted over the channel, a quality of the channel (e.g., a noise level of the channel), and/or the like.

In some implementations, configuration platform 115 may provide information identifying the data rate to network 110 (e.g., to a network device of network 110). Additionally, or alternatively, configuration platform 115 may provide information identifying the quality indicator, and/or the set of KPIs to the network device of network 110, and the network device may calculate the data rate based on the quality indicator and/or the set of KPIs. In some implementations, configuration platform 115 may provide information identifying the data rate to one or more devices (e.g., of network 110) that are associated with service providers (e.g., Internet service providers, web service providers, multimedia content providers, and/or the like). The one or more devices of the service providers may transmit data via the channel and at the data rate. Additionally, or alternatively, configuration platform 115 may provide information identifying the quality indicator, and/or the set of KPIs to the one or more devices associated with service providers, and the one or more devices of the service providers may calculate the data rate based on the quality indicator, and/or the set of KPIs.

In some implementations, configuration platform 115 may provide different portions or combinations of the information identifying the data rate, the quality indicator, and/or the set of KPIs available to different devices associated with the one or more service providers. For example, configuration platform 115 may provide information identifying the quality indicator, a factored weighted KPI associated with channel jitter, and a factored weighted KPI associated with channel latency available to a first service provider; may provide information identifying the quality indicator and a factored weighted KPI associated with channel throughput to a second service provider; may provide only information identifying the quality indicator to a third service provider; may provide information identifying the quality indicator and all of the factored weighted KPIs to a fourth service provider; and/or the like. In some implementations, configuration platform 115 may utilize a data structure (e.g., a permission table) to identify which service providers may receive which information identifying factored weighted KPIs, may receive information identifying the quality indicator, and/or the like.

In some implementations, configuration platform 115 may provide information identifying the data rate, the quality indicator, and/or the set of KPIs to a network device of network 110 by transmitting (e.g., over network 110) the information identifying the data rate, the quality indicator, and/or the set of KPIs to the network device. Additionally, or alternatively, configuration platform 115 may provide information identifying the data rate, the quality indicator, and/or the set of KPIs (e.g., via an application programming interface (API)) to an application executed by the network device. In some implementations, configuration platform 115 may provide information identifying the data rate, the quality indicator, and/or the set of KPIs to an application associated with a service provider of the one or more service providers, and the application may provide some or all of the information identifying the data rate, the quality indicator, and/or the set of KPIs to the service provider.

Figure 1G:
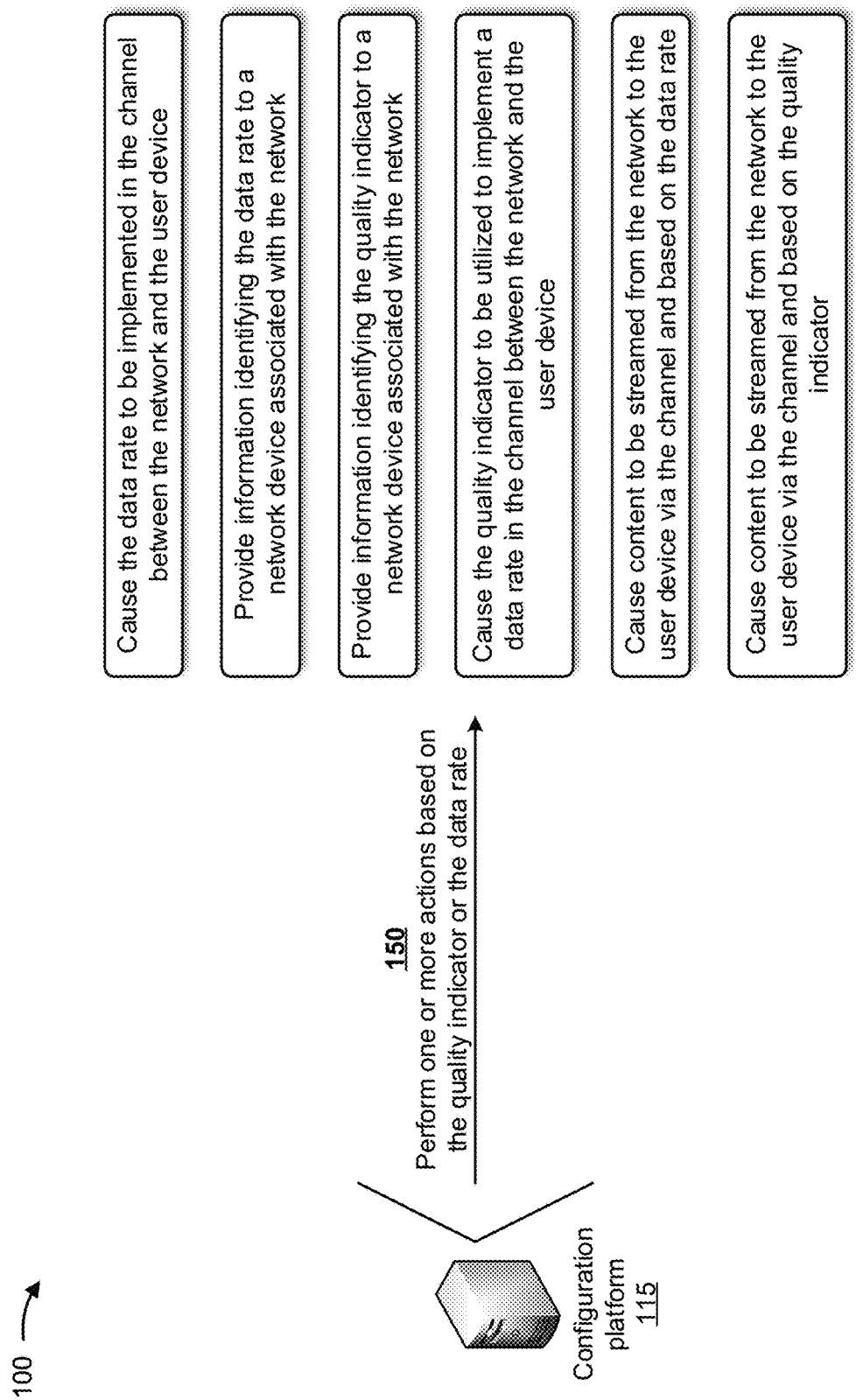

As shown in FIG. 1G, and by reference number 150, configuration platform 115 may perform one or more actions based on the quality indicator or the data rate. In some implementations, the one or more actions may include configuration platform 115 causing the data rate to be implemented in the channel between network 110 and user device 105. For example, configuration platform 115 may configure one or more network devices of network 110 to ensure that the data rate occurs by prioritizing traffic on the channel (e.g., for all traffic, traffic for particular user devices 105, and/or the like); reducing congestion on the channel (e.g., redirecting traffic not destined for user devices 105); and/or the like.

In this way, configuration platform 115 may determine an optimal data rate sooner and may enable a network device of network 110, a service provider, and/or the like to initially provide data via the channel at the optimal data rate, without having to wait until data has been provided for a period of time in order to determine the optimal data rate. This would lead to more optimal communications sooner, which conserves resources (e.g., computing resources, networking resources, and/or the like) that would otherwise be wasted adjusting the data rate, resending data, adapting to insufficient data, and/or the like.

In some implementations, the one or more actions may include configuration platform 115 providing information identifying the data rate to a network device associated with network 110. In this way, the network device may utilize the information identifying the data rate and may potentially combine the information identifying the data rate with other information locally available to the network device to determine an optimal data rate when initially providing data to user device 105, without having to wait until data has been provided for a period of time in order to determine the optimal data rate. This conserves resources that would otherwise be wasted adjusting the data rate, resending data, and/or the like, and improves the data rate and transmission of data on the channel based on information available to the network device.

In some implementations, the one or more actions may include configuration platform 115 providing information identifying the quality indicator to a network device associated with network 110. In this way, configuration platform 115 may enable the network device to calculate a data rate for the channel based on the quality indicator, which may conserve resources that would otherwise be required for configuration platform 115 or any other system or device to calculate the data rate. Furthermore, this may enable the network device to calculate the data rate based on the quality indicator combined with additional information that is available to the network device, which conserves resources that would otherwise be wasted obtaining the additional information, utilizing inaccurate information, and/or the like.

Configuration platform 115 may enable the network device to calculate the data rate for the channel based on information identifying the quality indicator and the set of KPIs, which enables calculation of a more accurate data rate for the channel.

In some implementations, the one or more actions may include configuration platform 115 causing the quality indicator to be utilized to implement a data rate in the channel between network 110 and user device 105. For example, configuration platform 115 may calculate the data rate based on the quality indicator, and may configure one or more network devices of network 110 to ensure that the data rate occurs by prioritizing traffic on the channel, reducing congestion on the channel, and/or the like.

In this way, configuration platform 115 may implement a data rate that is optimal for the channel before data is initially provided over the channel between network 110 and user device 105, which may enable user device 105 to immediately receive data at the optimal data rate. This provides a user of user device 105 with a positive user experience when receiving the data, and conserves resources that would otherwise be wasted adjusting the data rate, remediating insufficient data, resending data, and/or the like.

In some implementations, the one or more actions may include configuration platform 115 causing content to be streamed from network 110 to user device 105 via the channel and based on the data rate. For example, configuration platform 115 may configure one or more network devices of network 110 to ensure that video content is streamed from network 110 to user device 105 via the channel and based on the data rate. In this way, configuration platform 115 may enable a provider of the content to initially stream the video content at an optimal data rate, without having to wait for additional information in order to determine the optimal data rate. This conserves resources that would otherwise be wasted adjusting the data rate, remediating insufficient video content quality, resending video content, and/or the like. Additionally, this may provide a better user experience for the user of user device 105 in consuming the video content, by preventing poor initial quality at the outset of streaming the video content.

In some implementations, the one or more actions may include configuration platform 115 causing content to be streamed from network 110 to user device 105 via the channel and based on the quality indicator. For example, configuration platform 115 may configure one or more network devices of network 110 to ensure that video content is streamed from network 110 to user device 105 via the channel and based on the quality indicator. In this way, configuration platform 115 may enable a provider of the video content to calculate a data rate based on the quality indicator, which conserves resources that would be wasted calculating the data rate, providing the data rate to the provider, and/or the like. Additionally, this may enable the provider to utilize additional information in combination with the quality indicator to calculate the data rate, which conserves resources that would otherwise be wasted obtaining the additional information, utilizing inaccurate information, and/or the like. In some implementations, the data rate may enable network 110 to initially stream video content from network 110 to user device 105 via the channel and at rate greater than a rate determined without the quality indicator. In this way, configuration platform 115 may enable a user of 105 to have an improved user experience associated with consumption of the video content. In some implementations, configuration platform 115 may cause video content to be streamed based on the quality indicator and a set of KPIs, as discussed above, which may enable network 110 to stream the video content at an improved data rate for the channel.

In some implementations, configuration platform 115 may process the quality indicator and/or the data rate, with a machine learning model, to determine the one or more actions. In some implementations, configuration platform 115 may separate historical data (e.g., historical quality indicators, historical data rates, historical actions, and/or the like) into a training set, a validation set, a test set, and/or the like. The training set may be utilized to train the machine learning model. The validation set may be utilized to validate results of the trained machine learning model. The test set may be utilized to test operation of the machine learning model.

In some implementations, configuration platform 115 may train the machine learning model using, for example, an unsupervised training procedure and based on the historical data. For example, configuration platform 115 may perform dimensionality reduction to reduce the historical data to a minimum feature set, thereby reducing resources (e.g., processing resources, memory resources, and/or the like) to train the machine learning model, and may apply a classification technique to the minimum feature set.

In some implementations, configuration platform 115 may use a logistic regression classification technique to determine a categorical outcome (e.g., particular actions to perform based on particular quality indicators and/or particular data rates). Additionally, or alternatively, configuration platform 115 may use a naïve Bayesian classifier technique. In this case, configuration platform 115 may perform binary recursive partitioning to split the historical data into partitions and/or branches and use the partitions and/or branches to determine outcomes (e.g., particular actions to perform based on particular quality indicators and/or particular data rates). Based on using recursive partitioning, configuration platform 115 may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, configuration platform 115 may use a support vector machine (SVM) classifier technique to generate a non-linear boundary between data points in the training set. In this case, the non-linear boundary is used to classify test data into a particular class.

Additionally, or alternatively, configuration platform 115 may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, configuration platform 115 may use one or more other model training techniques, such as a neural network technique, a latent semantic indexing technique, and/or the like. For example, configuration platform 115 may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained machine learning model generated by configuration platform 115 by being more robust to noisy, imprecise, or incomplete data, and by enabling configuration platform 115 to detect patterns and/or trends undetectable to human analysts or systems using less complex techniques.

In some implementations, rather than training the machine learning model, configuration platform 115 may receive a trained machine learning model from another device (e.g., a server device). For example, a server device may generate the trained machine learning model based on having trained machine learning model in a manner similar to that described above, and may provide the trained machine learning model to configuration platform 115 (e.g., may pre-load configuration platform 115 with the trained machine learning model, may receive a request from configuration platform 115 for the trained machine learning models, and/or the like).

In this way, several different stages of the process for determining initial channel quality conditions of a channel for provision of content are automated, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that determines initial channel quality conditions of a channel for provision of content in the manner described herein. Finally, the process for determining initial channel quality conditions of a channel for provision of content conserves computing resources, networking resources, and/or the like that would otherwise be wasted in failing to provide the content to the user device, retransmitting the content to the user device, and/or the like.

As indicated above, FIGS. 1A-1G are provided merely as examples. Other examples may differ from what was described with regard to FIGS. 1A-1G. The number and arrangement of devices and networks shown in FIGS. 1A-1G are provided as an example. In practice, there may be additional devices and/or networks, fewer devices and/or networks, different devices and/or networks, or differently arranged devices and/or networks than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) of FIGS. 1A-1G may perform one or more functions described as being performed by another set of devices of FIGS. 1A-1G.

Figure 2:
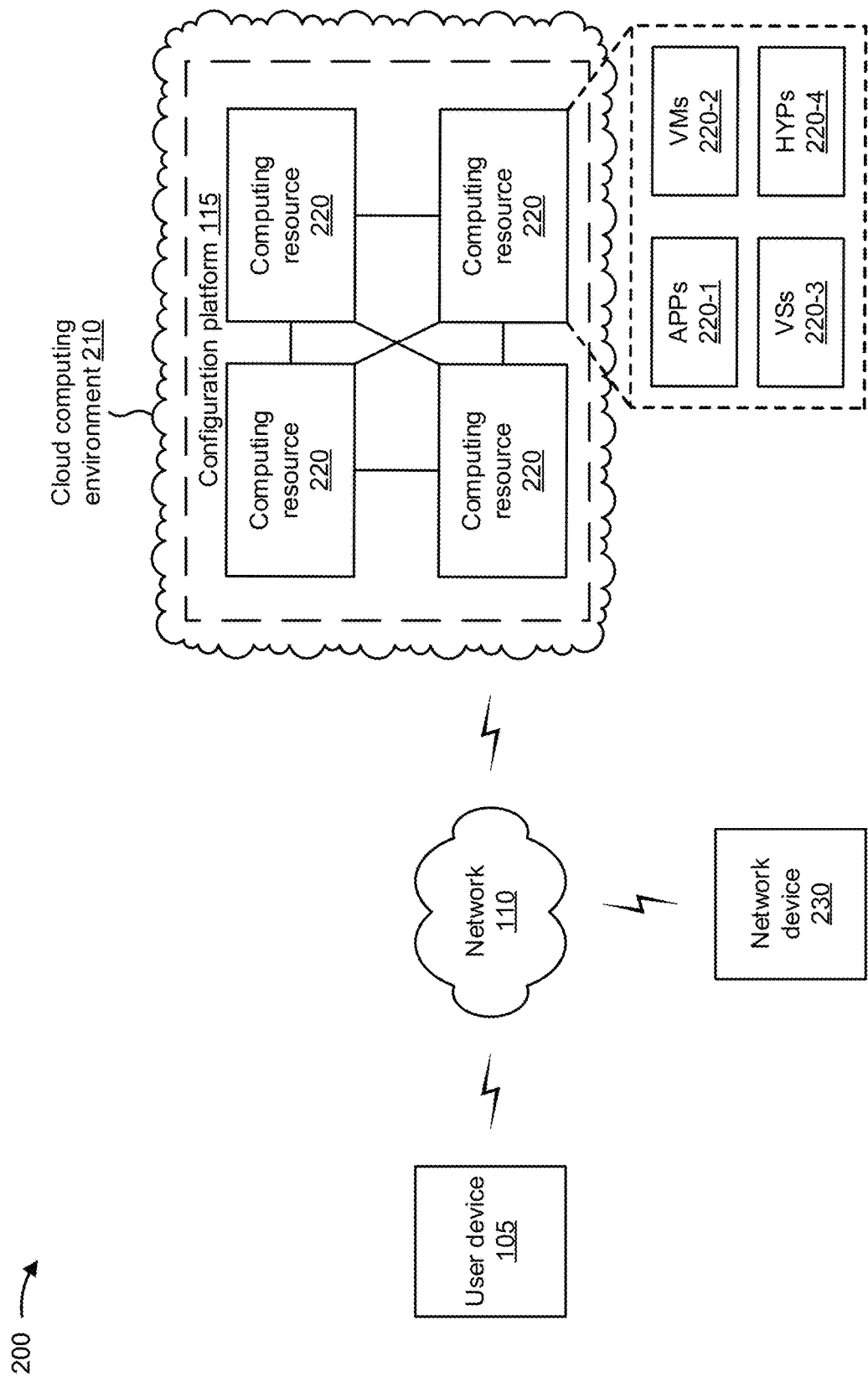
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user device 105, network 110, configuration platform 115, and a network device 230. Devices of environment 200 may interconnect via wired connections, wireless connections, or a combination of wired and wireless connections.

User device 105 includes one or more devices capable of receiving, generating, storing, processing, and/or providing information, such as information described herein. For example, user device 105 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.) or a similar type of device. In some implementations, user device 105 may receive information from and/or transmit information to network 110, configuration platform 115, and/or network device 230.

Network 110 includes one or more wired and/or wireless networks. For example, network 110 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. In some implementations, network 110 may receive information from and/or transmit information to user device 105 and/or configuration platform 115.

Configuration platform 115 includes one or more devices that determine initial channel quality conditions of a channel for provision of content. In some implementations, configuration platform 115 may be designed to be modular such that certain software components may be swapped in or out depending on a particular need. As such, configuration platform 115 may be easily and/or quickly reconfigured for different uses. In some implementations, configuration platform 115 may receive information from and/or transmit information to one or more user devices 105, network 110, and/or network device 230.

In some implementations, as shown, configuration platform 115 may be hosted in a cloud computing environment 210. Notably, while implementations described herein describe configuration platform 115 as being hosted in cloud computing environment 210, in some implementations, configuration platform 115 may not be cloud-based (i.e., may be implemented outside of a cloud computing environment) or may be partially cloud-based.

Cloud computing environment 210 includes an environment that hosts configuration platform 115. Cloud computing environment 210 may provide computation, software, data access, storage, etc., services that do not require end-user knowledge of a physical location and configuration of system(s) and/or device(s) that hosts configuration platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host configuration platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by user device 105. Application 220-1 may eliminate a need to install and execute the software applications on user device 105. For example, application 220-1 may include software associated with configuration platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of user device 105 or an operator of configuration platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network device 230 includes one or more devices capable of receiving, processing, storing, routing, and/or providing traffic (e.g., a packet, other information or metadata, and/or the like) in a manner described herein. For example, network device 230 may include a base station (e.g., a base transceiver station, a radio base station, a node B, an eNodeB (eNB), a gNodeB (gNB), a base station subsystem, a cellular site, a cellular tower, an access point, a transmit receive point (TRP), a radio access node, a macrocell base station, a microcell base station, a picocell base station, a femtocell base station, or a similar types of device) and other network devices that can support wireless communication for user device 105. In some implementations, network device 230 may be a physical device implemented within a housing, such as a chassis. In some implementations, network device 230 may be a virtual device implemented by one or more computer devices of a cloud computing environment or a data center.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
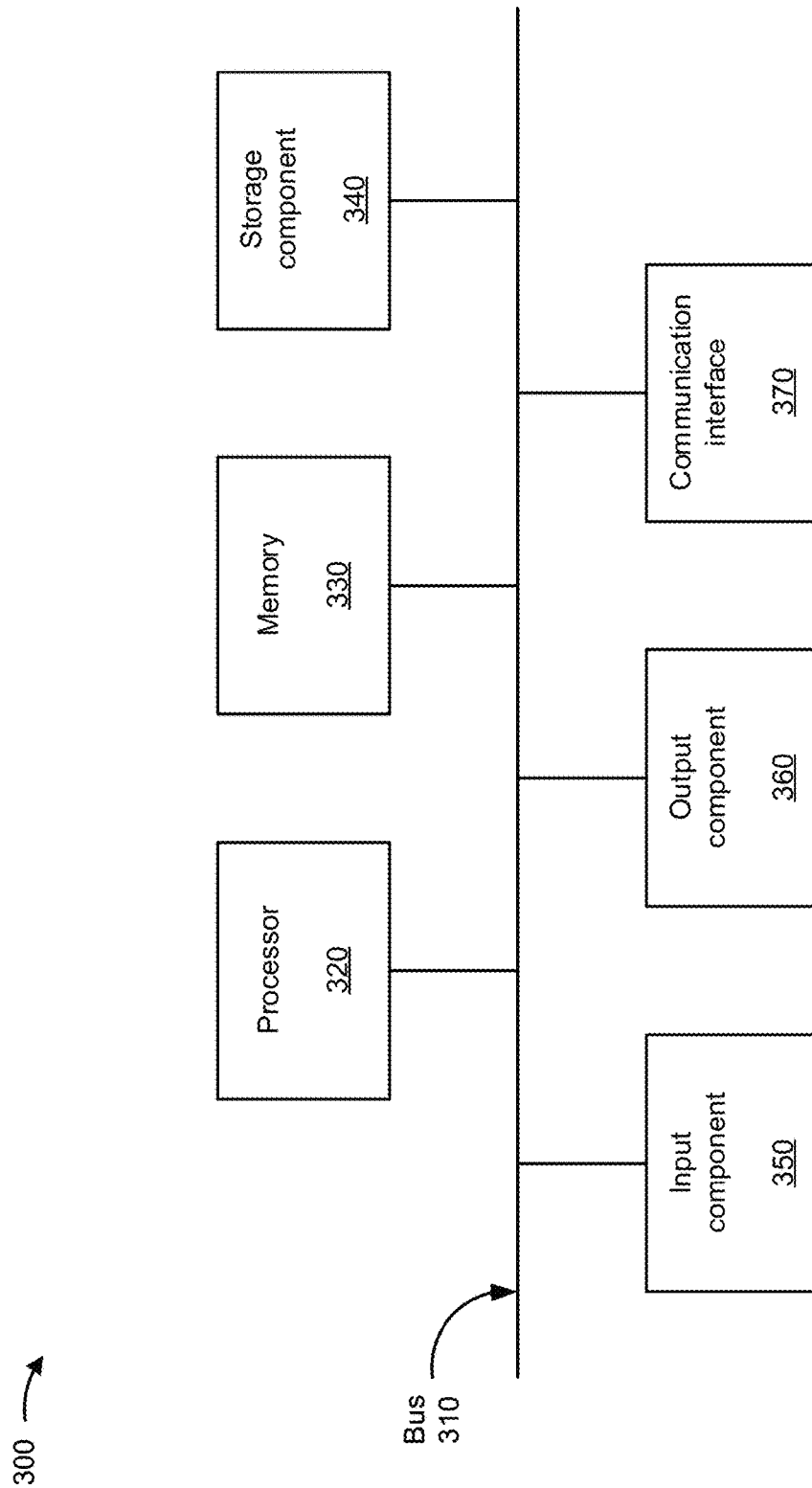
FIG. 3 is a diagram of example components of one or more devices of FIG. 2.

FIG. 3 is a diagram of example components of a device 300. Device 300 may correspond to user device 105, configuration platform 115, computing resource 220, and/or network device 230. In some implementations, user device 105, configuration platform 115, computing resource 220, and/or network device 230, may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
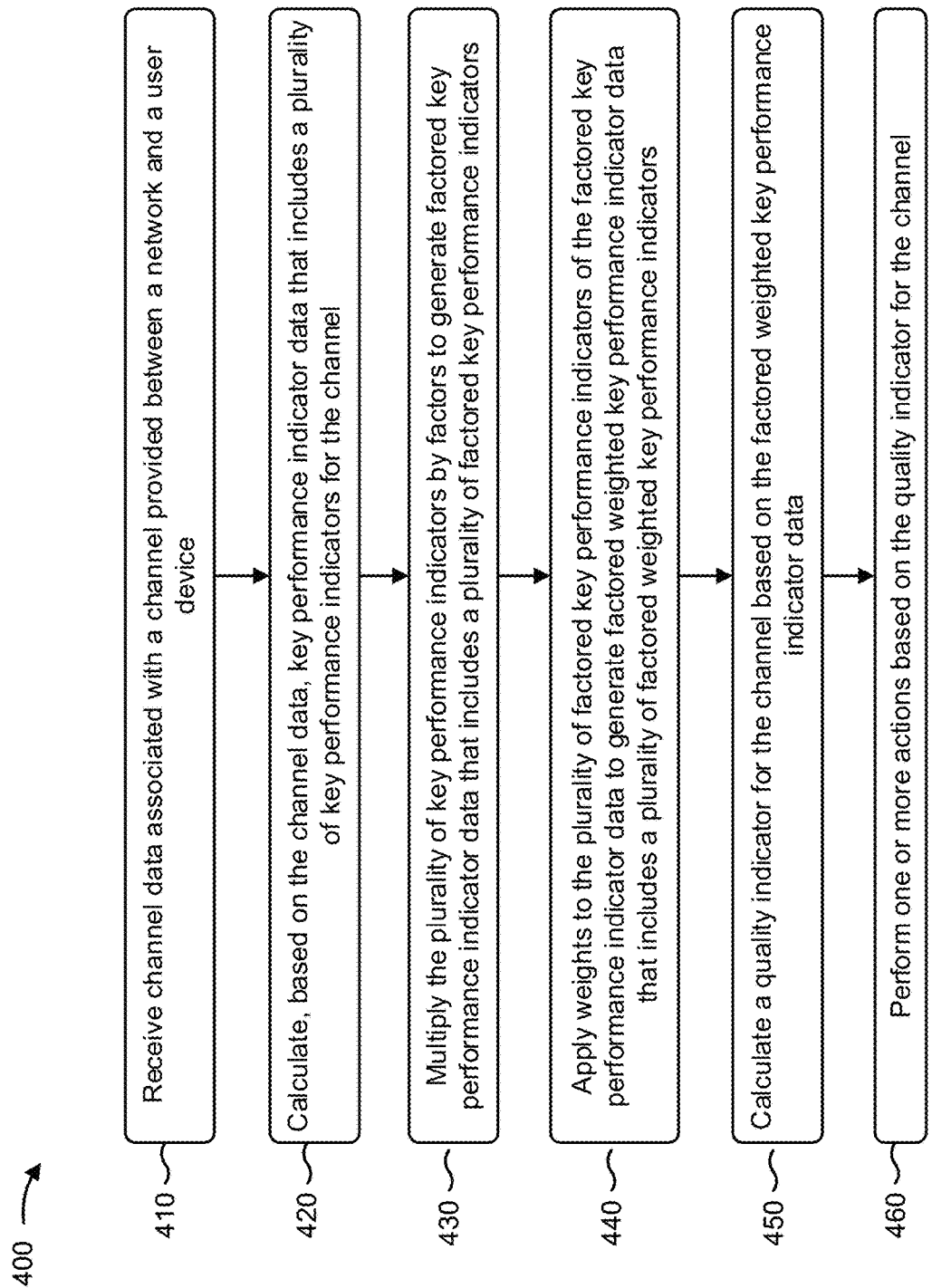
FIG. 4 is a flow chart of an example process for determining initial channel quality conditions of a channel for provision of content.

FIG. 4 is a flow chart of an example process 400 for determining initial channel quality conditions of a channel for provision of content. In some implementations, one or more process blocks of FIG. 4 may be performed by a device (e.g., configuration platform 115). In some implementations, one or more process blocks of FIG. 4 may be performed by another device or a group of devices separate from or including the device, such as a user device (e.g., user device 105) and/or a network device (e.g., network device 230).

As shown in FIG. 4, process 400 may include receiving channel data associated with a channel provided between a network and a user device (block 410). For example, the device (e.g., using computing resource 220, processor 320, communication interface 370, and/or the like) may receive channel data associated with a channel provided between a network and a user device, as described above.

As further shown in FIG. 4, process 400 may include calculating, based on the channel data, key performance indicator data that includes a plurality of key performance indicators for the channel (block 420). For example, the device (e.g., using computing resource 220, processor 320, memory 330, and/or the like) may calculate, based on the channel data, key performance indicator data that includes a plurality of key performance indicators for the channel, as described above. In some implementations, the plurality of key performance indicators may include data identifying a mobility of the user device, and one or more of a latency of the channel, jitter of the channel, a packet loss of the channel, utilization of the channel, throughput of the channel, a quality of service class identifier of the channel, a reference signal received power of the channel, or a geographic location of the user device. In some implementations, the data identifying the mobility of the user device may include data indicating a likelihood that the geographic location of the user device changes over time.

As further shown in FIG. 4, process 400 may include multiplying the plurality of key performance indicators by factors to generate factored key performance indicator data that includes a plurality of factored key performance indicators (block 430). For example, the device (e.g., using computing resource 220, processor 320, storage component 340, and/or the like) may multiply the plurality of key performance indicators by factors to generate factored key performance indicator data that includes a plurality of factored key performance indicators, as described above.

As further shown in FIG. 4, process 400 may include applying weights to the plurality of factored key performance indicators of the factored key performance indicator data to generate factored weighted key performance indicator data that includes a plurality of factored weighted key performance indicators (block 440). For example, the device (e.g., using computing resource 220, processor 320, memory 330, and/or the like) may apply weights to the plurality of factored key performance indicators of the factored key performance indicator data to generate factored weighted key performance indicator data that includes a plurality of factored weighted key performance indicators, as described above.

As further shown in FIG. 4, process 400 may include calculating a quality indicator for the channel based on the factored weighted key performance indicator data (block 450). For example, the device (e.g., using computing resource 220, processor 320, memory 330, storage component 340, and/or the like) may calculate a quality indicator for the channel based on the factored weighted key performance indicator data, as described above.

As further shown in FIG. 4, process 400 may include performing one or more actions based on the quality indicator for the channel (block 460). For example, the device (e.g., using computing resource 220, processor 320, memory 330, storage component 340, communication interface 370, and/or the like) may perform one or more actions based on the quality indicator for the channel, as described above. In some implementations, performing the one or more actions may include calculating a data rate for the channel based on the quality indicator, and causing the data rate to be implemented in the channel provided between the network and the user device.

In some implementations, performing the one or more actions, may include calculating a data rate for the channel based on the quality indicator and a set of key performance indicators of the plurality of key performance indicators, and causing the data rate to be implemented in the channel provided between the network and the user device. In some implementations, performing the one or more actions may include providing information identifying the quality indicator to a network device associated with the network, to cause the network device.

In some implementations, performing the one or more actions may include calculating a data rate for the channel based on the quality indicator, and providing information identifying the data rate to a network device associated with the network, to cause the network device to stream content from the network to the user device via the channel and based on the data rate. In some implementations, performing the one or more actions may include causing the quality indicator to be utilized to implement a data rate in the channel between the network and the user device.

In some implementations, performing the one or more actions may include providing, to a network device associated with the network, information identifying the quality indicator and a set of key performance indicators of the plurality of key performance indicators, where the set of key performance indicators include zero to all of the plurality of key performance indicators, and where the information identifying the quality indicator and the set of key performance indicators causes the network device to calculate a data rate for the channel based on the quality indicator and the set of key performance indicators, and stream content from the network to the user device via the channel and based on the data rate. The set of key performance indicators, provided to the network device, is determined based on criteria associated with the network.

In some implementations, performing the one or more actions may include calculating a data rate for the channel based on the quality indicator, where the data rate may enable the network to initially stream content from the network to the user device via the channel and at rate greater than a rate determined without the quality indicator. In some implementations, performing the one or more actions may include providing, via an application programming interface (API), information identifying the quality indicator to a network device associated with the network.

Process 400 may include additional implementations, such as any single implementation or any combination of implementations described above and/or below and/or in connection with one or more other processes described elsewhere herein.

For example, process 400 may include calculating variances associated with the plurality of factored weighted key performance indicators; and modifying one or more of the plurality of key performance indicators based on the variances associated with the plurality of factored weighted key performance indicators.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, channel data associated with a channel provided between a network and a user device;
   calculating, by the device and based on the channel data, key performance indicator data that includes a plurality of key performance indicators for the channel;
   multiplying, by the device, the plurality of key performance indicators by factors to generate factored key performance indicator data that includes a plurality of factored key performance indicators;
   applying, by the device, weights to the plurality of factored key performance indicators of the factored key performance indicator data to generate factored weighted key performance indicator data that includes a plurality of factored weighted key performance indicators;
   calculating, by the device, a quality indicator for the channel based on the factored weighted key performance indicator data; and
   performing, by the device, one or more actions based on the quality indicator for the channel.

2. The method of claim 1, wherein performing the one or more actions comprises:
   calculating a data rate for the channel based on the quality indicator; and
   causing the data rate to be implemented in the channel provided between the network and the user device.

3. The method of claim 1, wherein performing the one or more actions comprises:
   calculating a data rate for the channel based on the quality indicator and a set of key performance indicators of the plurality of key performance indicators,
   wherein the set of key performance indicators include zero to all of the plurality of key performance indicators; and
   causing the data rate to be implemented in the channel provided between the network and the user device.

4. The method of claim 1, wherein performing the one or more actions comprises:
   providing information identifying the quality indicator to a network device associated with the network, to cause the network device to:
      calculate a data rate for the channel based on the quality indicator, and
      stream content from the network to the user device via the channel and based on the data rate.

5. The method of claim 1, wherein performing the one or more actions comprises:
   calculating a data rate for the channel based on the quality indicator; and
   providing information identifying the data rate to a network device associated with the network, to cause the network device to stream content from the network to the user device via the channel and based on the data rate.

6. The method of claim 1, wherein performing the one or more actions comprises:
   causing the quality indicator to be utilized to implement a data rate in the channel between the network and the user device.

7. The method of claim 1, wherein the plurality of key performance indicators include data identifying:
   a mobility of the user device, and
   one or more of:
      a latency of the channel,
      jitter of the channel,
      a packet loss of the channel,
      utilization of the channel,
      throughput of the channel,
      a quality of service class identifier of the channel,
      a reference signal received power of the channel, or
      a geographic location of the user device.

8. A device, comprising:
   one or more memories; and
   one or more processors, communicatively coupled to the one or more memories, configured to:
      receive channel data identifying a bandwidth and traffic associated with a channel provided between a network and a user device;
      calculate, based on the channel data, a plurality of key performance indicators for the channel;
      multiply the plurality of key performance indicators by factors to generate a plurality of factored key performance indicators;
      apply weights to the plurality of factored key performance indicators to generate a plurality of factored weighted key performance indicators;
      calculate a quality indicator for the channel based on the plurality of factored weighted key performance indicators; and
      perform one or more actions based on the quality indicator for the channel.

9. The device of claim 8, wherein the one or more processors, when performing the one or more actions, are configured to:
   provide, to a network device associated with the network, information identifying the quality indicator and a set of key performance indicators of the plurality of key performance indicators, wherein the set of key performance indicators include zero to all of the plurality of key performance indicators, and wherein the information identifying the quality indicator and the set of key performance indicators causes the network device to:

calculate a data rate for the channel based on the quality indicator and the set of key performance indicators, and stream content from the network to the user device via the channel and based on the data rate.

10. The device of claim 9, wherein the set of key performance indicators, provided to the network device, is determined based on criteria associated with the network.

11. The device of claim 8, wherein the one or more processors are further configured to:

calculate variances associated with the plurality of factored weighted key performance indicators; and modify one or more of the plurality of key performance indicators based on the variances associated with the plurality of factored weighted key performance indicators.

12. The device of claim 8, wherein the data identifying a mobility of the user device includes data indicating a likelihood that a geographic location of the user device changes over time.

13. The device of claim 8, wherein the one or more processors, when performing the one or more actions, are configured to:

calculate a data rate for the channel based on the quality indicator, wherein the data rate enables the network to initially stream content from the network to the user device via the channel and at rate greater than a rate determined without the quality indicator.

14. The device of claim 8, wherein the one or more processors, when performing the one or more actions, are configured to:

provide, via an application programming interface (API), information identifying the quality indicator to a network device associated with the network.

15. A non-transitory computer-readable medium storing instructions, the instructions comprising:

one or more instructions that, when executed by one or more processors, cause the one or more processors to:

receive channel data associated with a channel provided between a network and a user device;

calculate, based on the channel data, key performance indicator data that includes a plurality of key performance indicators for the channel, wherein the plurality of key performance indicators include data identifying:

a mobility of the user device, and one or more of:

a latency of the channel, jitter of the channel, a packet loss of the channel, utilization of the channel, throughput of the channel, a quality of service class identifier of the channel, a reference signal received power of the channel, or a geographic location of the user device;

multiply the plurality of key performance indicators by factors to generate factored key performance indicator data that includes a plurality of factored key performance indicators;

apply weights to the plurality of factored key performance indicators of the factored key performance indicator data to generate factored weighted key performance indicator data that includes a plurality of factored weighted key performance indicators;

calculate a quality indicator for the channel based on the factored weighted key performance indicator data; and provide information identifying the quality indicator to a network device associated with the network, to cause the network device to:

stream content from the network to the user device via the channel and based on a data rate calculated for the channel based on the quality indicator.

16. The non-transitory computer-readable medium of claim 15, wherein the instructions further comprise:

one or more instructions that, when executed by the one or more processors, cause the one or more processors to:

calculate the data rate for the channel based on the quality indicator; and provide information identifying the data rate to the network device.

17. The non-transitory computer-readable medium of claim 15, wherein the instructions further comprise:

one or more instructions that, when executed by the one or more processors, cause the one or more processors to:

calculate the data rate for the channel based on the quality indicator and a set of key performance indicators of the plurality of key performance indicators, wherein the set of key performance indicators include zero to all of the plurality of key performance indicators; and provide information identifying the data rate to the network device.

18. The non-transitory computer-readable medium of claim 15, wherein the set of key performance indicators is determined based on criteria associated with the network.

19. The non-transitory computer-readable medium of claim 15, wherein the instructions further comprise:

one or more instructions that, when executed by the one or more processors, cause the one or more processors to:

calculate variances associated with the plurality of factored weighted key performance indicators; and modify one or more of the plurality of key performance indicators based on the variances associated with the plurality of factored weighted key performance indicators.

20. The non-transitory computer-readable medium of claim 15, wherein the data identifying the mobility of the user device includes data based on a moving average and indicating a likelihood that the geographic location of the user device changes over time.

* * * * *